No. 886,577. PATENTED MAY 5, 1908.
H. G. BOYD & W. R. McKAY.
METHOD OF GENERATING POWER GAS.
APPLICATION FILED APR. 23, 1906.
2 SHEETS—SHEET 1.
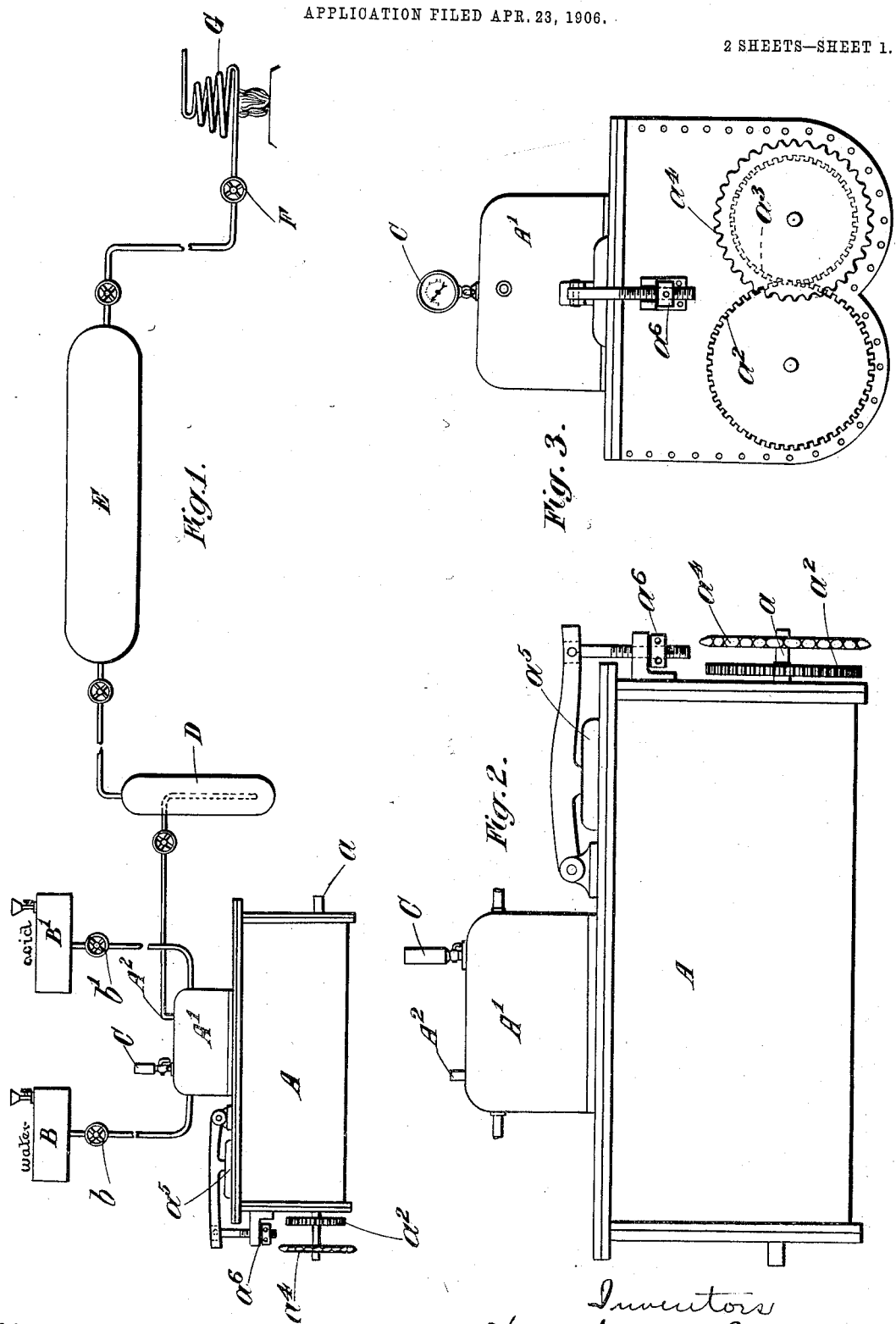

No. 886,577.

PATENTED MAY 5, 1908.

H. G. BOYD & W. R. McKAY.
METHOD OF GENERATING POWER GAS.
APPLICATION FILED APR. 23, 1906.

2 SHEETS—SHEET 2.

UNITED STATES PATENT OFFICE.

HENRY GEORGE BOYD AND WILLIAM ROWLAND McKAY, OF LONDON, ENGLAND.

METHOD OF GENERATING POWER-GAS.

No. 886,577.

Specification of Letters Patent.

Patented May 5, 1908.

Application filed April 23, 1906. Serial No. 313,317.

*To all whom it may concern:*

Be it known that we, HENRY GEORGE BOYD and WILLIAM ROWLAND McKAY, both subjects of the King of Great Britain, residing, respectively, at 6 Palace Gardens Mansions, Kensington, and Coventry House, South Place, both in the county of London, England, have invented certain new and useful Improvements in or Relating to the Method of Generating Power-Gas, of which the following is a specification.

This invention relates to the generation of power gas, the object being to produce such gas in a simple, efficient, and economical manner, capable of being used with facility and safety for various purposes where a driving force is required or power is to be utilized, as for example, in connection with motors, stationary and locomotive engines, and machinery generally.

According to our invention, the generation of power gas is effected in an appropriately constructed apparatus such as that hereinafter described, by the employment of suitable calcareous matter in conjunction with a metal such as iron and an appropriate acid such as sulfuric acid diluted to the requisite strength. The calcareous matter may consist of oyster, mussel or other marine shells, or any material consisting of or containing chalk, as for example, whiting. The constituents and proportions of the same for obtaining a gaseous mixture of appropriate composition may be approximately as follows: five pounds of shells and four pounds of whiting to about one pound of iron filings, to which dilute acid is added at a rate proportionate to the pressure of gas required, or the proportion of the iron filings may be reduced to one ounce and equally satisfactory results obtained. The carbonic acid gas that forms a constituent of the gaseous mixture prevents the latter from being inflammable.

In order that the invention may be clearly understood and readily carried into effect, we will proceed to describe the same with reference to the accompanying drawings in which:—

Figure 5:
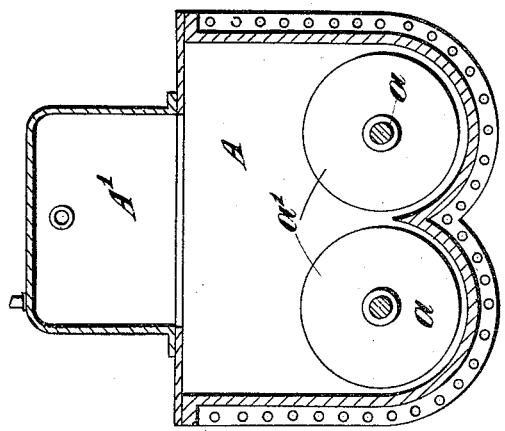
Figure 4:
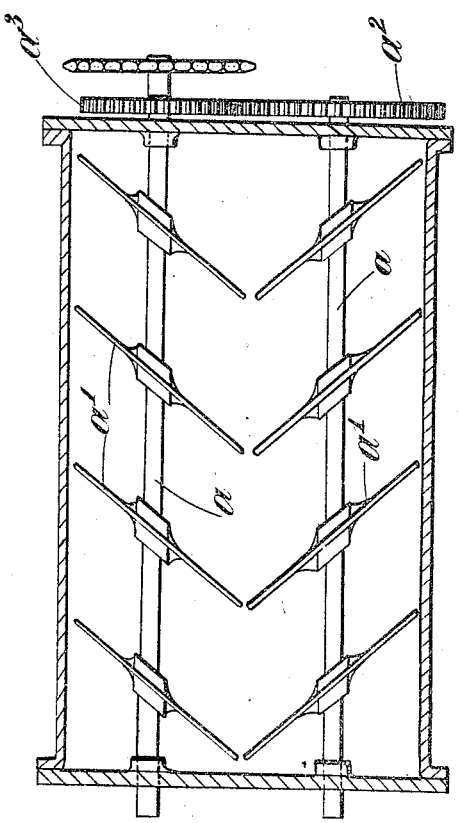

Figure 1 is a diagrammatic view of the general arrangement of the apparatus suitable for our purpose. Fig. 2 is a side elevation of the chamber in which the motive gas is generated from the aforesaid ingredients and Fig. 3 is an end elevation of the same. Fig. 4 is a horizontal section and Fig. 5 a vertical section of the said chamber.

The apparatus comprises a chamber A, preferably of metal, lined if necessary with lead or other appropriate substance, and containing spindles $a$, $a$, carrying blades or disks $a'$ with or without brushes, said blades $a'$ being adapted to be rotated in the said chamber for keeping the materials therein in constant agitation; and for this purpose the extremities of the spindles may be provided with gear wheels $a^2$, $a^3$, of different diameters, so that the blades are revolved at different speeds and in opposite directions. One of the said spindles has a sprocket wheel $a^4$ adapted for connection, by chain gearing or the like, with a motor or other driving engine, a convenient form of clutch being provided to throw the gearing into and out of action as required.

The chamber A is provided with an air-tight charging door $a^5$, and when the charging operation has been completed the said door $a^5$ is securely closed and held in position by a clamping device $a^6$. When it is desired to generate gas, the blades or disks $a'$ are caused to rotate, and water and acid are run into the chamber from tanks B, B' respectively, which are preferably situated so that their contents gravitate to the chamber A, the quantity from each tank being regulated by cocks $b$, $b'$. The water need not be added simultaneously with introduction of the acid, the amount of each and the order in which they are introduced being effected in accordance with the reading of the pressure gage C and the quantity and pressure of gas required. The gas or gases produced by the chemical reactions within the chamber A collect in the dome A', and are led by way of an outlet pipe $A^2$ to a moisture trap D of appropriate construction, and thence to a storage chamber or cylinder E; the latter is capable of holding sufficient gas under pressure to start an engine or machine even when the generating apparatus is not in operation, so that the engine or machine may be maintained in action until said generating apparatus is able to be set into operation and generate sufficient gas to provide a further supply to said cylinder E.

It will be advantageous to heat the gases in their passage from the storage chamber E to the working cylinder of the engine or other machine to be driven thereby, and for this purpose they may be passed, by way of a stop valve F, through a heated coil G, connected with the said working cylinder or machine.

Although iron and sulfuric acid have been mentioned as constituents in our process for the manufacture of motive gas or fluid, we do not confine ourselves to those materials; steel may be employed together with any other suitable acid or mixture of acids. In some instances the water employed may hold metals or carbon in suspension.

The apparatus may be provided with all the usual and necessary accessories, such as blow-off cocks, air-tight stuffing boxes for mounting the spindles $a$ in the chamber A, and similar devices.

What we claim and desire to secure by Letters Patent of the United States is:—

1. A method of obtaining power gas which consists in subjecting a mixture of metallic particles, marine shells and whiting to the action of an acid admitted to a closed chamber containing the said mixture, agitating the contents of said chamber and supplying the gas thus generated to perform useful work substantially as described.

2. A method of obtaining power gas which consists in subjecting a mixture of metallic particles, marine shells and whiting to the action of an acid admitted to a closed chamber containing the said mixture, agitating the contents of said chamber, supplying the gas thus generated to perform useful work and heating the gas in its way to perform such work, substantially as described.

3. A method of obtaining power gas which consists in subjecting a mixture of metallic particles, marine shells and whiting to the action of an acid admitted in regulated quantities to a closed chamber containing the said mixture, agitating the contents of said chamber and supplying the gas thus generated to a storage chamber, after removing the moisture from said gas, so that it will be in a condition suitable to perform useful work substantially as described.

In testimony whereof we have hereunto set our hands in presence of two subscribing witnesses this eleventh day of April 1906.

HENRY GEORGE BOYD.
WILLIAM ROWLAND McKAY.

Witnesses:
T. SELLEY WARDLE,
CHAS. S. RUTLIDGE.